Nov. 23, 1943.  V. DAHLMAN  2,335,144
DRY FILTER
Filed March 6, 1942  4 Sheets-Sheet 1

INVENTOR
VERNER DAHLMAN
BY Arthur F. Robert
ATTORNEY

Nov. 23, 1943.  V. DAHLMAN  2,335,144
DRY FILTER
Filed March 6, 1942  4 Sheets-Sheet 2
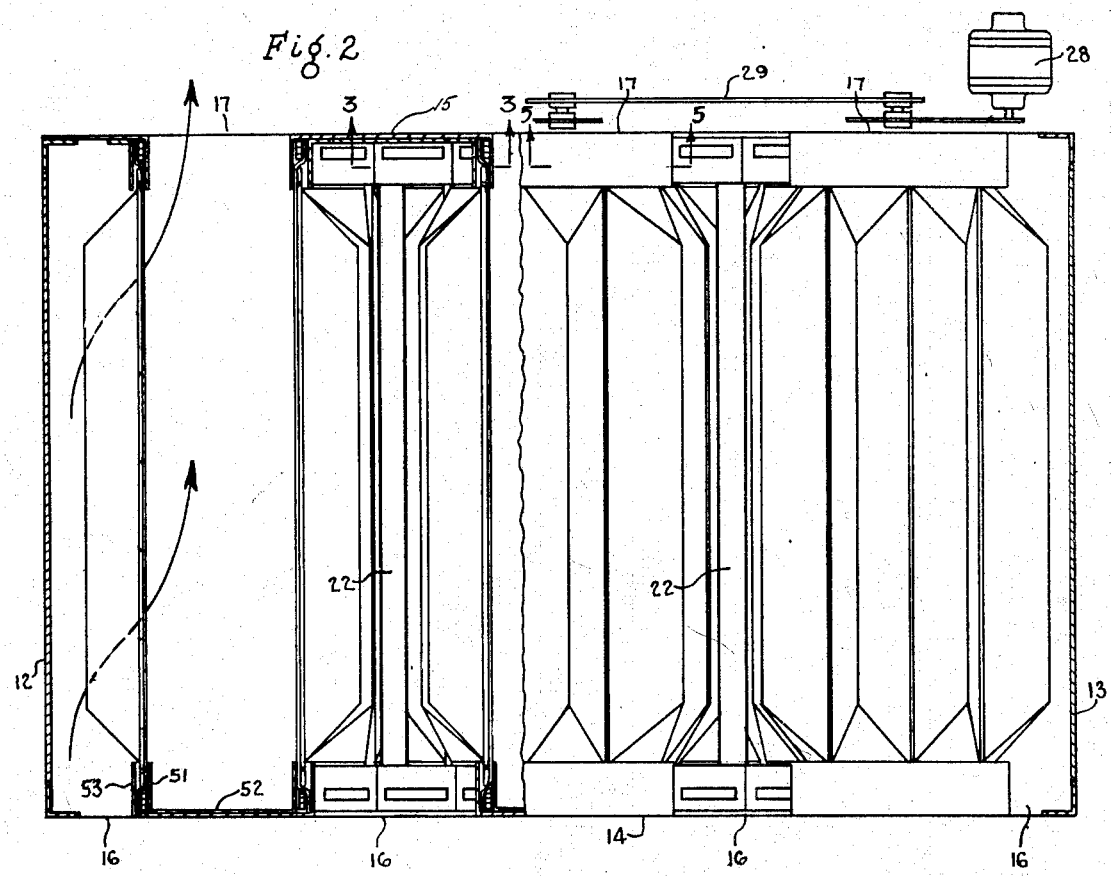
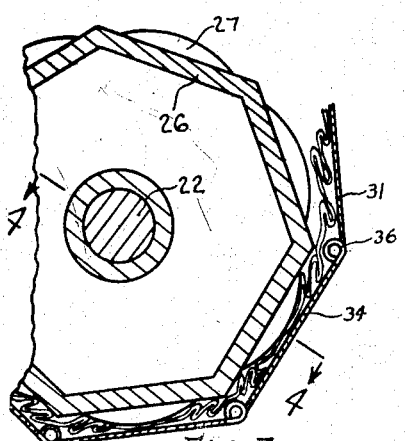
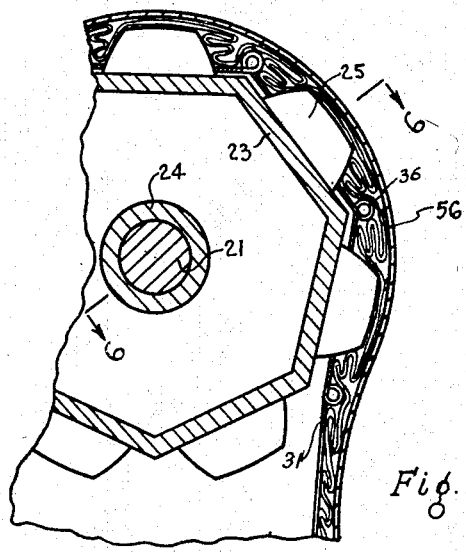
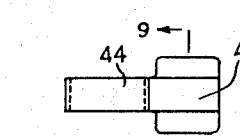
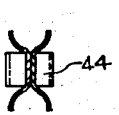
INVENTOR
VERNER DAHLMAN
BY Arthur F. Robert
ATTORNEY

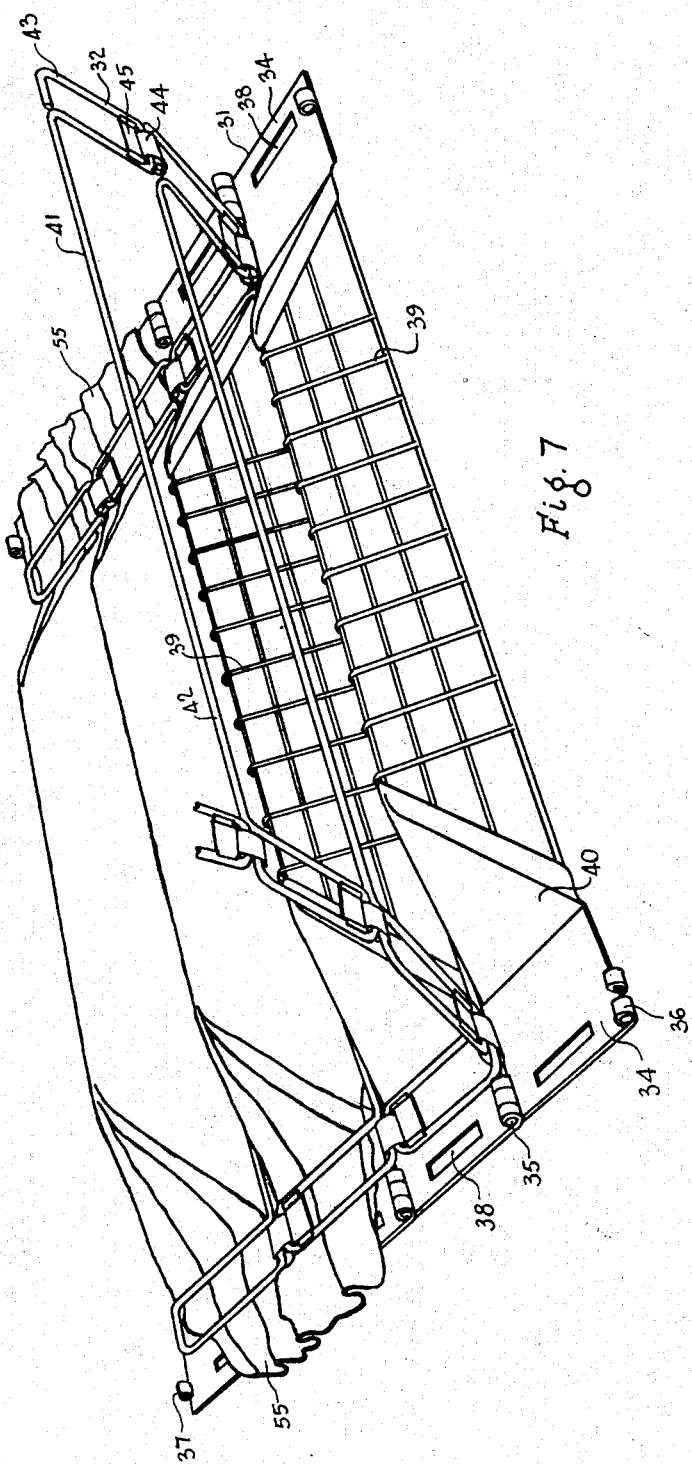

Patented Nov. 23, 1943

2,335,144

UNITED STATES PATENT OFFICE 2,335,144

DRY FILTER

Verner Dahlman, Louisville, Ky., assignor to American Air Filter Company, Inc., Louisville, Ky., a corporation of Delaware Application March 6, 1942, Serial No. 433,550

15 Claims. (Cl. 183—62)

This invention relates to automatic dry filters of the type wherein a sheet-like filter medium is interposed between two conveyors and carried by them along a serpentine path extending across the air flow, and more particularly, to an automatic dry filter of a type especially adapted to the use of an air filter medium of the cellulose fibre type such as that disclosed in Birkholz Patent No. 1,897,976.

In the dry types of filters, the area of filter medium through which the air is passed must of necessity be relatively large in order to sufficiently reduce the resistance or pressure drop within a filter of requisite dimensions, it is accordingly desirable to arrange the filter medium in a corrugated or serpentine path extending across the air flow.

In order to produce a self-cleaning filter of this type, it has heretofore been proposed to interpose and move the flat filter medium between two flat screen-like conveyors, along a corrugated or serpentine path extending across the air flow. This arrangement has not been successful, because at each turn in the path, the outer conveyor travels faster than the inner conveyor, creating relative movement therebetween which causes the interposed filter medium to be either abraded and ruptured at the turns, or pulled away from the sealing means along its edges or both. This problem is particularly acute in the handling of a relatively fragile filter medium of the type disclosed in the afore-mentioned patent. To avoid abrasion, it has been proposed to separate the conveyors at the turns and direct the inner and outer conveyors around separate inner and outer turns. This "double turn" arrangement, however, not only renders the filter more cumbersome and expensive for the same filtration area but also raises serious problems as to sealing at the turns.

In overcoming the aforesaid disadvantages, the principal object of my invention is to provide a novel automatic dry type filter in which the filter medium, even that of the relatively fragile cellulose type, is transported along a tortuous path without damage to the medium and with efficient sealing at all necessary points.

A further object is to accomplish the above result with a simple and compact device.

Another object is to provide a conveyor for a dry type air filter, which conveyor is composed of two sections between which the filter medium is carried, and which can pass around reverse bends without relative linear motion between the two portions, thereby preventing damage to the filter medium and increasing the efficiency of the seals.

Still a further object of my invention is the provision in an automatic dry filter of the type described of novel sealing means in conjunction with the reverse bends of the filter medium whereby the overall efficiency of the filter is increased.

Further advantages of my invention will appear from the following description and claims taken in conjunction with the accompanying drawings wherein:

Figure 2 is a section taken along line 2—2 of Figure 1, showing the multiple compartments into which the air is fed and from which it is discharged.

Figure 3 is a section taken on line 3—3 of Figure 2, showing the manner of sealing the lower conveyor sprockets.

Figure 5 is a section taken on line 5—5 of Figure 2, showing the manner of sealing the upper conveyor sprockets.

Figure 7 is a perspective view of a portion of the conveyor assembly with filtering medium on a portion thereof.

Figure 8 is a plan of the hinge element employed for connecting the links of one conveyor.

Figure 9 is a section taken on line 9—9 of Figure 8.

Figure 1:
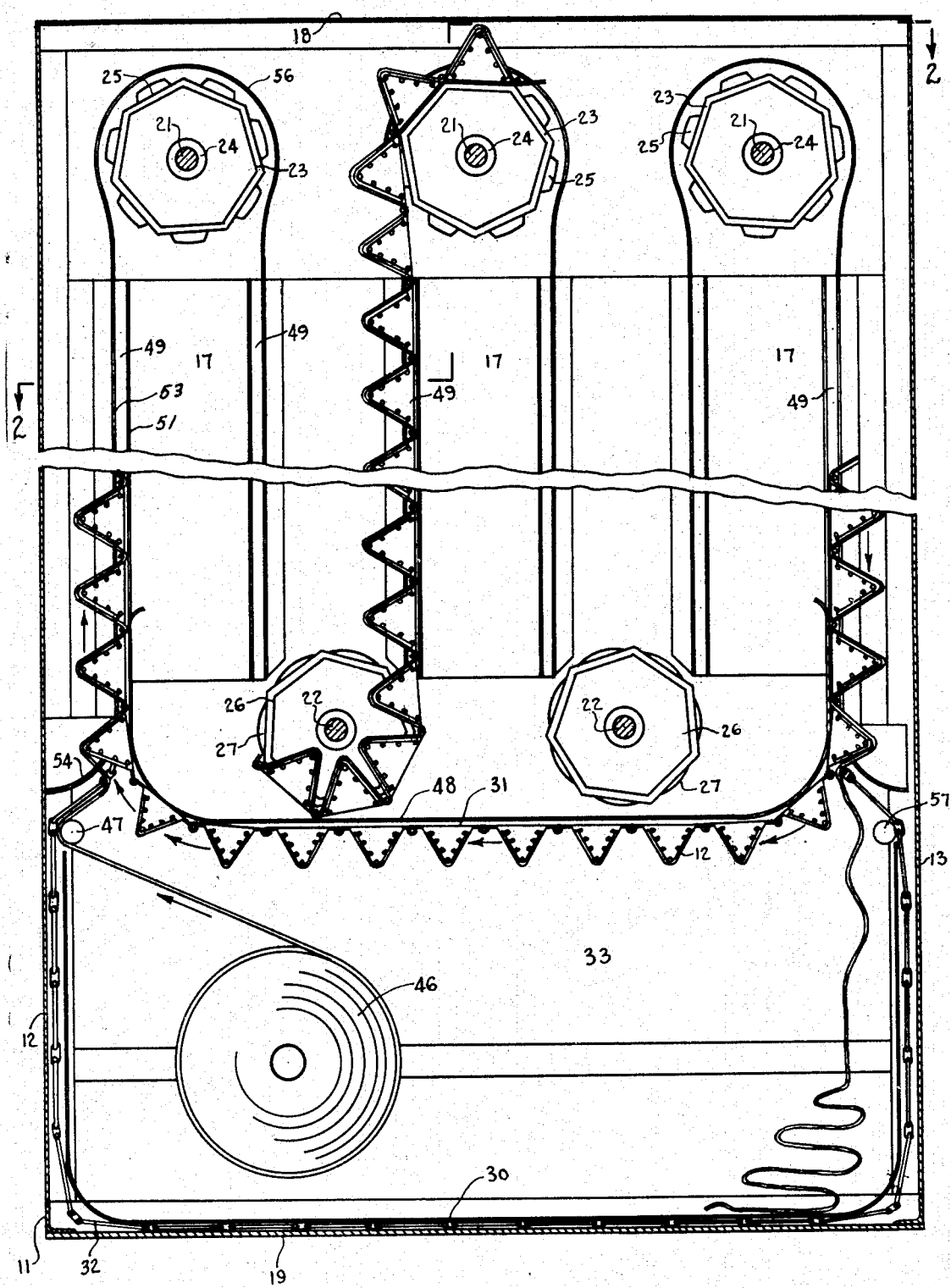
Figure 1 is a vertical section of a preferred embodiment of the present invention looking in the general direction of the air flow with portions of the conveyor removed to show the sealing channels.

In accordance with the present invention, the abrading and rupturing of the filter medium, however fragile it might be, by the conveyors between which it is interposed, is prevented by offsetting the joints between the links of at least one of the conveyors and arranging both conveyors so that the axes of the joints between corresponding links of the two conveyors substantially coincide during substantially the entire serpentine path through which the conveyors convey the filter medium.

Referring more particularly to the drawings wherein like parts are designated by like numerals of reference throughout the several views, the filter of the present invention preferably comprises a casing 11 having closed end walls 12 and 13, and side walls 14 and 15 having openings 16 and 17, respectively, therein. Openings 16 function as air inlets and openings 17 as air outlets, the inlets and outlets being staggered relative to one another so that the air in passing through the casing must take a tortuous course as indicated by the arrows in Figure 2. The top of the casing is closed by a wall 18 and the bottom of the casing by a wall 19. The casing is divided into an upper section in which the filtering takes place and a relatively small lower section 33 for handling of the filter medium.

A number of like shafts 21 are rotatably mounted in suitable bearings in side walls 14 and 15 adjacent the top of the casing. A number of other like shafts 22 are rotatably mounted in suitable bearings in side walls 14 and 15 adjacent the lower end of the air flow section of the casing.

Figure 6:
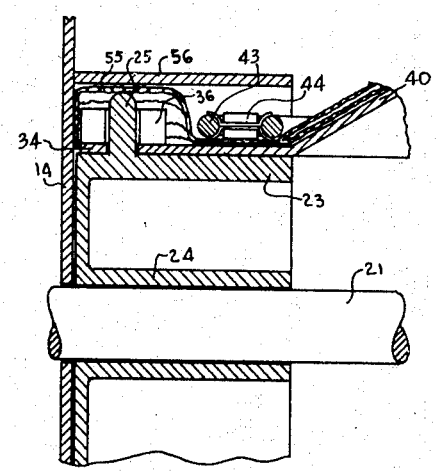
Figure 6 is a section taken on line 6—6 of Figure 5.

Each shaft 21 mounts a pair of sprockets 23, each sprocket being adjacent a side wall of the casing and formed with a hub 24 (Fig. 6) closely fitting about shaft 21 and preferably keyed or otherwise secured to the shaft to rotate therewith. The outer surface of each sprocket 23 is formed in generally polygonal shape, each flat face thereof being provided with an outwardly projecting and relatively blunt tooth 25.

Each shaft 22 mounts a pair of sprockets 26, each sprocket 26 being positioned adjacent a side wall of the housing in staggered relation with an upper sprocket 23. The outer surfaces of sprockets 26 are also of polygonal shape, a curved abutment or protuberance 27 being provided upon each of their flat faces. Sprockets 26 are provided with hubs similar to hubs 24 of sprockets 23 which may be keyed to shafts 22 to rotate therewith.

Suitable means is provided for the rotation of shafts 21 in motor 28 connected through suitable reduction drive mechanisms 29, such as sprocket and chain drives, to the shafts at points where they project from side wall 15.

Sprockets 23 and 26 support an inner conveyor 31 and an outer conveyor 32 (Fig. 1), the two conveyors being in contact with one another and arranged to follow a common path in the air filtering section of the housing and being separated from one another in the lower part of the housing as shown in Figure 1.

Conveyor 32, the outer conveyor, is substantially longer than conveyor 31 to enable the aforesaid separation in the lower part of the housing and to provide storage chamber 33 in the lower part of the housing for the storage of the clean filter medium and reception of the dirty filter medium, the bottom and sides of this space being defined by a plate 30 which prevents contact of the dirty filter medium with the lower pass of conveyor 32 and prevents entanglement of the dirty filter medium with the lower pass of the conveyor.

Conveyor 31 (Fig. 7) includes a plurality of individual links having substantially flat end portions 34 connected together by hinge pins 35 in hinge elements 36 and 37 formed on the ends of sections 34. Each section 34 is formed adjacent its outer side with an aperture 38 of a size to be engaged by sprocket teeth 25 of sprocket 23, the remaining portion of the section being solid.

Sections 34 of each link are transversely connected by a preferably V-shaped or generally pyramidal projecting section 39 formed of expanded metal or wire mesh, which serves to engage the filter medium and form it as a series of corrugations or successive pyramids whereby the effective air filtering area thereof is materially increased. While sections 39 may be flat, semi-circular or of any desired shape, pyramidal-shaped sections of the type shown in Figure 7 are preferred. The filter medium is handled more readily thereby because of the sloping triangular-shaped end faces 40 which tend to guide the filter medium outwardly toward the sides of the conveyor. Section 39 may be secured to section 34 by welding or like means.

Outer conveyor 32 is formed of a series of links 41, each of which includes a rod 42, arranged to extend through the valley between two sections 39 of conveyor 31, and a loop portion 43 at each end of generally rectangular shape, the entire link being thus formed of a single rod or wire. Loops 43 are connected to one another by hinge elements 44 (Figs. 8 and 9). Each of elements 44 is formed with an ear or double yoke member 45 which is fixed to one of the loops 43 by crimping, welding or similar means to prevent any pivotal action other than about the axis of rod 42.

The dimension of the links of conveyor 32 as measured transverse of the direction of movement of the conveyor 31 is such that when rods 42 are in position in the valleys between the successive pyramidal sections 39, carrying the filter medium, rods 42 will be in axial alignment with hinge pins 35, this being possible by the offset of hinge pins 35 from the general plane of the conveyor end sections 34. This arrangement prevents any differential movement between the conveyors on the turns with consequent abrading and rupturing of the filter medium.

A roll or container of clean filter medium 46 is mounted in storage chamber 33, the filter medium being fed from the roll around an idler roller 47 and into contact with conveyors 31 and 32 in the direction indicated by the arrows. The filter medium is of greater width than the conveyors as shown in Fig. 7 and is positioned so the portions thereof extend beyond the sides of the conveyors to cooperate in forming seals as will be later explained.

As will be noted in Figure 1, conveyor 31 travels through storage chamber 33 and is guided therethrough by a U-shaped guide plate or partition 48, which is secured to side walls 14 and 15 in air-tight relation to define the bottom of the filter section proper and the top of storage section 33. Guide plate 48 extends sufficiently far to guide conveyor 31 into a generally U-shaped channel formed by one leg 51 (Fig. 2) of a channel iron 52, the opposite side of the U-shaped channel 49 being formed by leg 53 of a second channel iron 53 which forms a part of side wall 14. Channel iron 53 is sufficiently large to receive channel iron 52, the upstanding legs of the two channel irons forming two of the U-shaped sealing channels 49. The opposite channels 49 on wall 15 may be similarly formed of channel irons forming a part of or secured to wall 15 or of channel irons and small angle irons.

At its lower end, leg 53 is alined with a curved section 54, which guides conveyor 32 into contact with the filter medium and conveyor 31 so that the filter medium is forced to conform to the successive pyramidal sections 39 of conveyor 31 and form the desired successive pyramids or corrugations. At this point, the filter medium first comes into contact with the air to be cleaned and begins to function as a filter.

It will be noted from Figure 1 that the upturned ends of partition 48 are of sufficient length so that one valley between the filter pyramids is always in contact with them across the entire width of the conveyor, thus insuring an adequate seal at the points where the filter medium enters and leaves the filter chamber proper.

Channel 49 functions at this time to hold conveyors 31 and 32 tightly together so that a seal is formed along the edges thereof to prevent the by-passing of air. Also by reason of the relatively narrow width of channels 49, the extended ends of the filter medium shown at 55 in Figure 7 are compressed to further form a seal to prevent the passage of air around the filter medium.

In its continued movement, the filter medium passes around one of sprockets 23, this sprocket being surrounded for a major portion of its periphery with an arcuate member or band 56, which is a continuation of the extending portion of leg 53 of channel 49 and is suitably secured to the side wall. Leg 51 of channel 49 terminates at this point, the sealing function being taken over by band 56 and sprocket 23. Member 56 is of sufficient width to extend inwardly into the casing over sprocket 23 (Figure 6) and over the sections 34 of the links of conveyor 31. As conveyors 31 and 32 pass around sprocket 23, sections 34 of conveyor 31 engage the chordal faces of the sprocket, legs 25 entering apertures 38. The corners on the sprocket surface align with the hinge elements on sections 34 to hold the latter in positions whereby the filter medium is pressed against the inner surface of band 56 to form a substantially air-tight seal. At the same time, the ended portion 55 of the filter medium is forced against side wall 14. Lugs 25 are so proportioned that they operate to press the adjacent portions of the filter medium against the inner surface of band 56, thereby effecting a seal opposite the chordal faces of the sprocket. This arrangement insures sealing opposite the sprocket faces as well as at the wall side of the sprocket.

Upon leaving sprocket 23, the two conveyors with the interposed filter medium enter another U-shaped channel 49 and pass downwardly and around the first sprocket 26.

In passing around sprocket 26, conveyor 31, which was the inner conveyor in passing around sprocket 23, becomes the outer conveyor. Sealing is here accomplished by the projections 27 pressing the adjacent portion of the filter medium into contact with the sections 34 of conveyor 31. By reason of the hinge elements on conveyor 31, which prevent contact of sections 34 with the faces of sprockets 26 (Fig. 3), projections 27 must be of a height to extend outwardly sufficiently far to be able to press the filter medium against sections 34 with considerable force. Preferably, projections 27 are of such size that hinge elements 36 and 37 can function to press the filter medium against the corners on the surface of sprocket 26, thereby increasing the efficiency of the seal.

Figure 4:
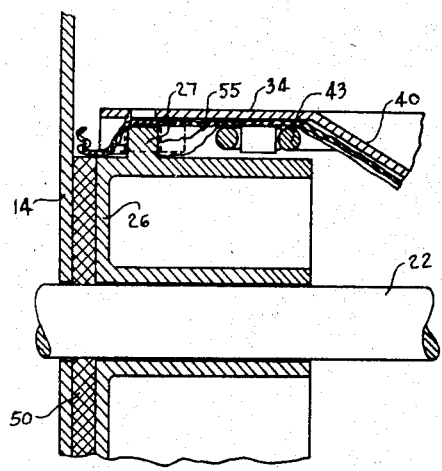
Figure 4 is a section taken on line 4—4 of Figure 3.

At sprockets 26, the sealing is necessary between the filter medium and the sprocket rather than between the filter medium and the casing as is the case with sprockets 23. Therefore, to complete the seal, it is preferred to insert discs 50 of felt or like material between sprockets 26 and the casing wall (Figure 4).

Upon leaving the last U-shaped channel 49, conveyor 32 is separated from conveyor 31 by an idler roller 57 whereupon the filter medium falls to the bottom of storage space 33 onto plate 30 and is collected.

In the operation of the illustrated embodiment, the conveyor is operated at a rate preferably determined by an automatic control of the type disclosed in my copending application, S. N. 385,461 filed March 27, 1941 (Patent No. 2,298,469, issued Oct. 13, 1942) whereby when the filter medium reaches idler roller 57, it has become too dirty to be any longer effective. When moving, the rate of movement of the conveyor is such that the successive corrugations or pyramids are properly formed without rupture of the filter medium.

In operation, after the filter has been set in operation, air or any other gas to be cleaned is forced into inlet openings 16 from which it passes through the passes of filter medium out of air outlets 17, the dirt or dust in the air being deposited on the filter medium.

In the present invention, the relative movement between the inner and outer conveyors during the entire range of movement of the filter medium including its reverse bends around sprockets 23 and 26 is negligible with the result that there is no rupture or noticeable abrasion of the filtering medium, however fragile it might be. The seals provided in channels 49 and in connection with sprockets 23 and 26 insure adequate sealing against the passage of air except through the filter medium.

If desired, instead of the disposable filter medium above mentioned, a more substantial medium such as felt or flannel may be used. In this case, the filter medium can be dry cleaned, vacuumed or otherwise renovated in the space between the conveyors in chamber 33 and immediately re-introduced into the path across the air stream, thus making the filtering and filter-medium cleaning cycle a continuous process.

Figure 10:
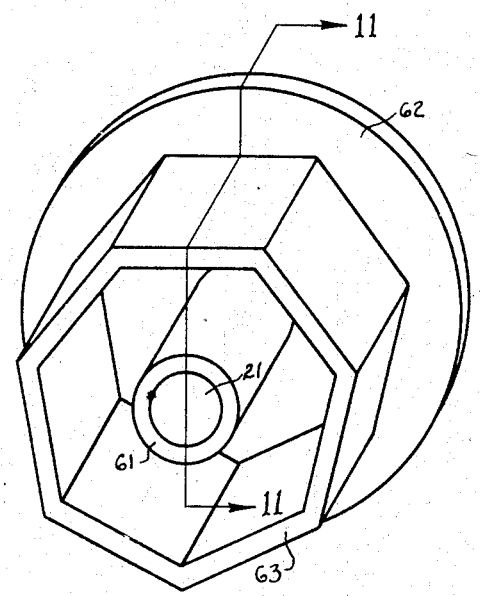
Figure 10 is a perspective view of a modified form of sprocket that may be used in the filter of Figure 1.
Figure 11:
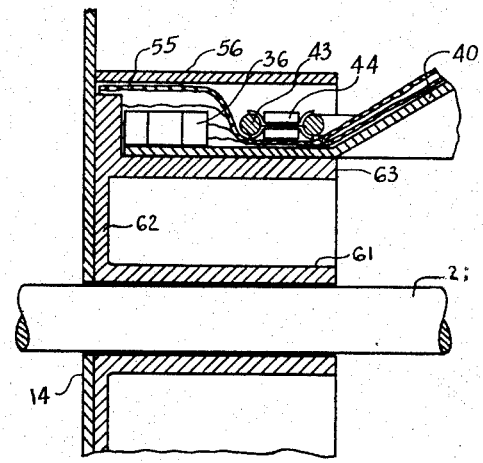
Figure 11 is a section taken on the line 11—11 of Figure 10 illustrating the sprocket in operative relation with the conveyor and the filter medium.

In Figs. 10 and 11, I have shown a modified form of sprocket that can be used in lieu of sprocket 23. This sprocket includes a hub 61 mounted on shaft 21; a circular end flange 62, and a polygonal-faced conveyor engaging section 63, the latter being of less diameter than flange 62 whereby the latter projects beyond section 63 to a point closely adjacent band 56.

This sprocket functions to seal in a manner similar to sprocket 23 except that the function of lugs 25 is taken over by flange 62 which compresses the extending portion 55 of the filter medium against the inner surface of band 56. A circular flange such as flange 62 possesses an advantage over the spaced lugs 25 of sprocket 23 in that it functions entirely around the inner surface of band 56 whereas lugs 25 function at spaced intervals.

Having described my invention, I claim:

1. An air filter in which a sheet-like filter medium is interposed between two conveyors for movement along a serpentine path traversing the air flow through the filter, wherein: each of said conveyors is composed of links pivotally joined, the axis of each joint on one conveyor coinciding with the axis of a joint on the other conveyor while said conveyors are on the turns of said path.

2. An air filter in which a sheet-like filter medium is interposed between two conveyors for movement along a path traversing the air flow through the filter, said path having at least one curved portion, wherein: each of said conveyors is composed of links pivotally joined, the axis of each joint of one conveyor coinciding with the axis of a joint of the other conveyor while said conveyors are on said curved portion.

3. The filter of claim 2, in which the axes of the joints of the conveyor on one side of the filter medium are offset to coincide with the axes of the adjacent joints of the conveyor on the other side of said filter medium.

4. The filter of claim 2 wherein: the links of one of the conveyors are substantially V-shaped in cross-section throughout at least a portion of the width of the conveyor; and the links of the other conveyor include elements which extend into the valleys of said V-shaped links whereby the two conveyors cooperate to corrugate the filter medium on said V-shaped portions, and to transport said medium in its corrugated state along said path.

5. The filter of claim 2 wherein: the links of one of the conveyors present a series of crests and valleys throughout the length of the conveyor in sequence in the direction of travel, and the links of the other conveyor include elements which extend into said valleys, whereby the two conveyors cooperate to corrugate the filter medium, and to transport said medium in its corrugated state along said path.

6. An air filter comprising two endless articulated conveyors following a common path traversing the air flow through the filter and separate paths returning from the exit end to the entrance end of said common path, each joint of one conveyor being in coaxial relationship with a joint of the other conveyor while on said common path; means to drive said conveyors; and a sheet-like filter medium interposed between and carried by the conveyors along said common path, the medium being introduced at the entrance end and discharged at the exit end of said common path.

7. The filter of claim 6 wherein: one of the conveyors completely surrounds the other conveyor; and the space between the separate paths of the conveyors is utilized for handling of filter medium ready to be introduced into, and after its discharge from, said common path.

8. In an air filter in which a sheet-like filter medium is interposed between two conveyors for movement along a serpentine path traversing the air flow through the filter, means to guide said conveyors and filter medium along said path comprising a substantially circular rotatable member, and a stationary arcuate member surrounding a portion of the rotatable member, the latter being provided with means to compress the filter medium against the inner surface of the stationary member in substantially air tight relation.

9. In an air filter in which a sheet-like filter medium is interposed between two conveyors for movement along a serpentine path traversing the air flow through the filter, one of said conveyors being formed as a chain having a series of spaced openings, means to guide said conveyors and filter medium along said path comprising a sprocket having teeth to engage said openings, and a stationary arcuate member surrounding a portion of said sprocket, said sprocket teeth being of sufficient size to compress the filter medium against the inner surface of said member in substantially air tight relation.

10. In an air filter in which a sheet-like filter medium is interposed between two conveyors for movement along a serpentine path traversing the air flow through the filter, one of said conveyors being formed as a chain, means to guide said conveyors and filter medium along said path comprising a sprocket, and a stationary arcuate member surrounding a portion of the sprocket, the latter being provided with means to compress the filter medium against the inner surface of said member in substantially air tight relation.

11. In an air filter in which a sheet-like filter medium is interposed between two conveyors for movement along a serpentine path traversing the air flow through the filter, and the filter medium is wider than said conveyors and positioned to extend beyond said conveyors at the sides thereof, one of said conveyors being formed as a chain having a series of spaced openings, means to guide said conveyors and filter medium along said path comprising sprockets having teeth to engage said openings, and a substantially semi-circular member surrounding each of said sprockets and provided with a side wall positioned to engage and compress the extending portion of said filter medium, said sprocket teeth being of sufficient size to compress the filter medium against the inner surface of said member.

12. In an air filter in which a sheet-like filter medium is interposed between two conveyors for movement along a serpentine path traversing the air flow through the filter, means to guide said conveyors and filter medium along said path comprising a rotatable polygonal-faced member, and a protuberance on each face arranged to compress the filter medium against one of said conveyors in substantially air tight relation.

13. In an air filter in which a sheet-like filter medium is interposed between two conveyors for movement along a serpentine path traversing the air flow through the filter, one of said conveyors being formed of a plurality of individual links having substantially solid portions, means to guide said conveyors and filter medium along said path comprising a rotatable member having faces to support said solid portions, and a protuberance on each face to compress the filter medium against said solid portions in substantialy air tight relation.

14. An air filter of the type in which a sheet-like filter medium is interposed between two conveyors for movement along a serpentine path traversing the air flow through the filter, one of said conveyors being formed of a series of articulated links having perforate central sections and substantially solid end sections having hinged connections with the similar end sections of adjacent links, the other conveyor being formed of links of less width, the axes of the hinges of said second conveyor being coaxial with the hinges of said first conveyor.

15. The filter of claim 14 wherein the end sections of the links of the second conveyor comprise wire loops and the hinge means connecting said loops is formed with a portion fixed to one of said loops to prevent hinging about a line other than the axial line of the hinges of the first conveyor.

VERNER DAHLMAN.